United States Patent [19]

Forsen

[11] 3,959,649

[45] May 25, 1976

[54] COLLECTION OF IONS IN A PLASMA BY MAGNETIC FIELD ACCELERATION WITH SELECTIVE POLARIZATION

[75] Inventor: Harold K. Forsen, Bellevue, Wash.

[73] Assignee: Jersey Nuclear-Avco Isotopes, Inc., Bellevue, Wash.

[22] Filed: Dec. 27, 1973

[21] Appl. No.: 428,661

[52] U.S. Cl. .............................. 250/299; 250/282; 250/283; 250/288
[51] Int. Cl.² ......................................... H01J 39/34
[58] Field of Search ........... 250/282, 283, 288, 289, 250/290, 423, 425, 298, 299

[56] References Cited
UNITED STATES PATENTS

| | | | |
|---|---|---|---|
| 2,938,116 | 5/1960 | Benson et al. ...................... 250/287 |
| 2,945,125 | 7/1960 | Bruck et al. ........................ 250/298 |
| 3,294,970 | 12/1966 | Jenckel .............................. 250/426 |
| 3,443,087 | 5/1969 | Robieux et al. ..................... 250/290 |
| 3,478,204 | 11/1969 | Brubaker et al. .................... 250/423 |
| 3,484,603 | 12/1969 | Bloom et al. ....................... 250/251 |
| 3,723,741 | 3/1973 | Ehrenstein ......................... 250/251 |
| 3,772,519 | 11/1973 | Levy ................................. 250/288 |

Primary Examiner—James W. Lawrence
Assistant Examiner—B. C. Anderson
Attorney, Agent, or Firm—Weingarten, Maxham & Schurgin

[57] ABSTRACT

Method and apparatus for generating and accelerating ions in a vapor by use of relatively polarized laser radiation and a magnetic field. As applied to uranium isotope enrichment, a flowing uranium vapor has particles of the $U_{235}$ isotope type selectively ionized by laser radiation and the ionized flow is subjected to a transverse gradient in a magnetic field. The magnetic field gradient induces an acceleration on the ionized particles of $U_{235}$ which deflects them from their normal flow path toward a collecting structure. High magnetic field and corresponding high ion accelerations are achieved without loss in ionization selectivity by maintaining a polarization between the applied laser radiation and magnetic field which minimizes Zeeman splitting of the uranium energy states.

24 Claims, 4 Drawing Figures

COLLECTION OF IONS IN A PLASMA BY MAGNETIC FIELD ACCELERATION WITH SELECTIVE POLARIZATION

FIELD OF THE INVENTION

This invention relates to the acceleration of charged particles in a magnetic field and in particular to acceleration of selectively ionized particles by a gradient in a particularly polarized magnetic field.

BACKGROUND OF THE INVENTION

A new technique for uranium enrichment, specifically enrichment of the $U_{235}$ isotope, is shown in patent application Ser. No. 25,605, filed Mar. 25, 1970 now U.S. Pat. 3,772,519, and in corresponding French pat. 71.14007, Jan. 10, 1971, specifically incorporated herein by reference. An exemplary system there disclosed operates by generating a vapor of uranium metal which expands as a particle flow. The $U_{235}$ isotope is selectively ionized by application of narrow bandwidth precisely tuned laser radiation to selectively excite and ionize the $U_{235}$ isotope without substantial ionization of the $U_{238}$ isotope or other isotopes. Once ionized, the particles of the $U_{235}$ isotope are separated from the plasma by changing their flow direction under the influence of a pulsed electric and continuous magnetic field which produces crossed-field magnetohydrodynamic forces on the ions. The different trajectory of these ions resulting from the crossed-field acceleration permits their collection apart from the remaining constituents of the vapor flow.

If it is desired to use only a magnetic field to separate the selectively ionized particles from the plasma, additional factors must be taken into consideration for an efficient enrichment scheme. In particular, it is desired to use a high density vapor flow in order to increase the quantity of particles which are separated. The increasing density predicts a reduction in the charge exchange time for the selectively ionized particles which, in turn, demands a higher or stronger magnetic field in order to deflect the flowing ions by a substantial angle before they lose their charge and are no longer affected by the magnetic field. A strong magnetic field, however, increases the Zeeman splitting or broadening of the absorption lines for each isotope thereby reducing the efficiency or selectivity of the excitation and ionization produced by the laser radiation.

BRIEF SUMMARY OF THE INVENTION

In accordance with the present invention, a system is shown for selectively ionizing particles of one isotope type in an environment of particles of plural isotope types and for separating the particles through the interaction of a polarized magnetic field upon ion motion in the environment.

In particular application to the enrichment of the $U_{235}$ isotope of uranium, the present invention operates in a system wherein uranium metal is vaporized to provide an expanding vapor flow into the region of a magnetic field gradient where the application of laser radiation produces selective ionization of the $U_{235}$ isotope. The selectivity is enhanced substantially by limiting Zeeman splitting in the uranium absorption lines under the influence of the magnetic field. This reduction is achieved by maintaining a predetermined polarization between the laser beam and magnetic field.

The electrons released by ionization of the particles of the $U_{235}$ isotope generally maintain the same temperature as the ions and other particles of the environment. At least the electrons are accelerated by the magnetic gradient field toward the weaker field point. Because of charge neutrality requirements of the plasma, the accelerated electrons will drag the $U_{235}$ ions with them. By providing collection plates in the path of the accelerated electrons and ions, the particles of the $U_{235}$ isotope may be collected.

BRIEF DESCRIPTION OF THE DRAWINGS

These and other features of the present invention will be more fully understood by reference to the following detailed description of the preferred embodiment, presented for purposes of illustration and not by way of limitation, and to the accompanying drawings of which.

DETAILED DESCRIPTION OF THE PREFERRED EMBODIMENT

The present invention contemplates a method and means for selectively ionizing and separating particles of one isotope type from an environment of flowing particles (atomic or molecular) of plural isotope types by application of laser radiation and a magnetic field gradient in a direction transverse to the ionized particle flow and parallel to the laser polarization. In order to understand the features of the present invention for magnetic field extraction of ionized particles from a flow, the isotope separation system with which the invention is associated will first be described.

Figure 1:
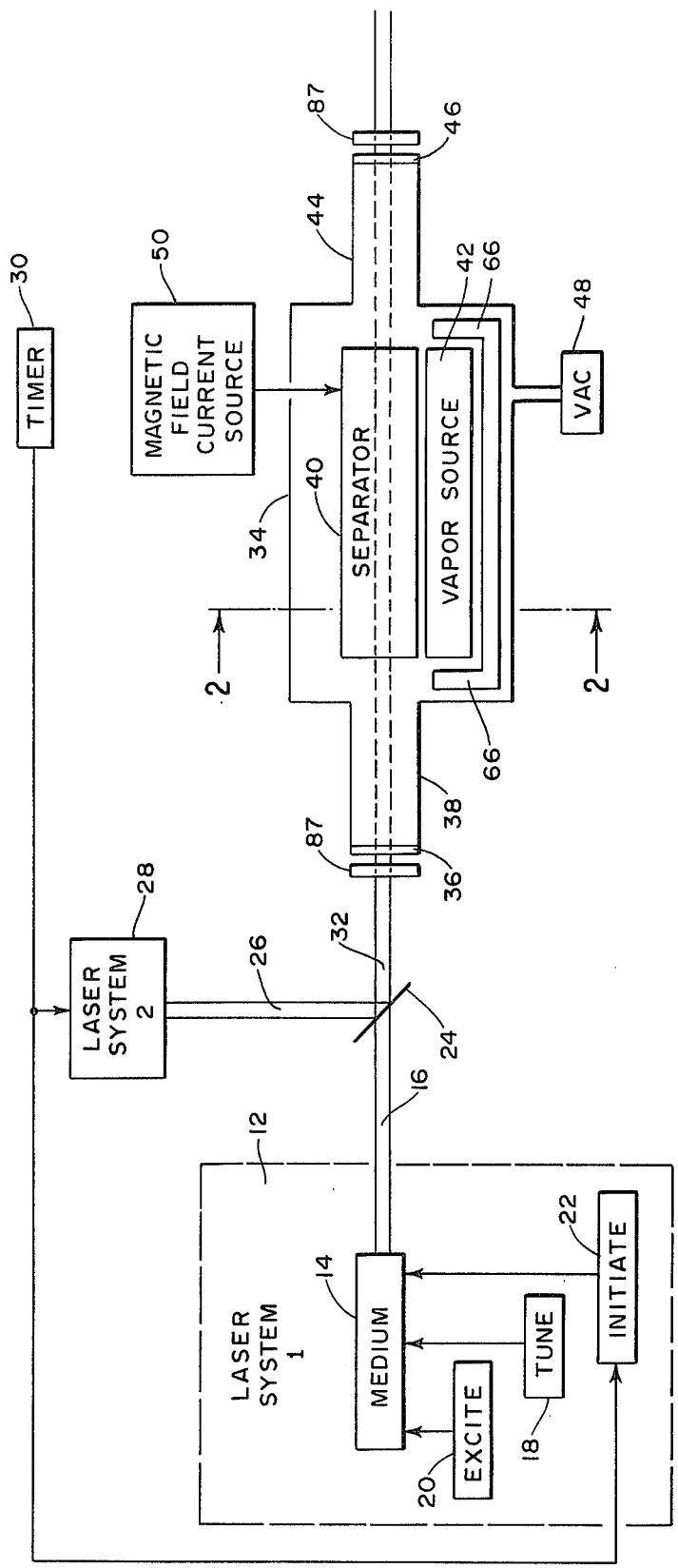
FIG. 1 is a diagrammatic representation of the system for isotope enrichment according to the present invention.

By reference to FIG. 1, a system for isotope enrichment is diagrammatically presented and comprises a first laser system 12 having a lasing medium 14, which may typically be a dye solution and which has an output beam 16 of laser radiation. Tuning of the beam 16 appropriate for selective excitation of the $U_{235}$ isotope is maintained by a tuning system 18 which may comprise the typical elements of a laser cavity. An etalon filter or other frequency selective means may be added to the cavity for maintaining a sufficiently narrow bandwidth and precise radiation frequency for the beam 16. The lasing medium 14 is excited to a lasing condition, through generation of a population inversion in the medium particles, by an excitation system 20 which may include a further laser or flashlamp. Initiation of each pulse of radiation in the output beam 16 is provided by a trigger 22. Typically, the radiation pulses are initiated periodically.

In typical application, the laser system 12 may comprise a Dial-A-Line laser of the Avco Everett Research Laboratory, Inc., Everett, Massachusetts, including, where desired, one or more stages of amplification.

The output beam 16 is combined by a dichroic mirror 24 with the output beam 26 of a further laser system 28. A timer system 30 provides preferably coincident activation of the laser systems 12 and 28 for typically simultaneous output pulses in a repeating time sequence. The pulse duration may typically range between a few nanoseconds and a substantial fraction of a microsecond.

The dichroic mirror 24 provides a composite beam 32 of laser radiant energy (one or more frequencies) and contains photon energies selected to provide selective excitation of vaporized $U_{235}$ particles without corresponding excitation of $U_{238}$ particles, and further to provide one or more additional energy steps which result in ionization of the selectively excited $U_{235}$ particles. The particular photon energies for excitation and ionization may be selected from published lists of absorption lines for the $U_{235}$ isotope, or the other isotopes, to be separated.

Selective excitation and ionization are achieved within an evacuated chamber 34 to which the laser radiation in beam 32 is applied through a window 36, typically optical quartz, on an elongated pipe 38 to prevent contamination of the window 36. The laser beam 32 passes through a separator 40 where selective excitation and ionization is produced in an environment of vapor particles. The vapor is created by a vapor source 42 which preferably beams a radially expanding vapor flow into the separator 40. The beam 32 continues through the chamber 34 to exit through a pipe 44 and window 46 and may typically be used in one or more similar chambers to provide efficient utilization of the radiation. A vacuum pump 48 maintains a low pressure within the chamber 34 to prevent atmospheric constituents from interfering with the processes of the invention, for example, by particle collisions, combustion or otherwise.

A magnetic field current source 50 applies magnetic field current to coil structures within the ion separator 40 to provide a magnetic field gradient which interacts with the flowing plasma that results from selective ionization to produce an acceleration on the ions for collection apart from the other components of the vapor environment.

Figure 2:
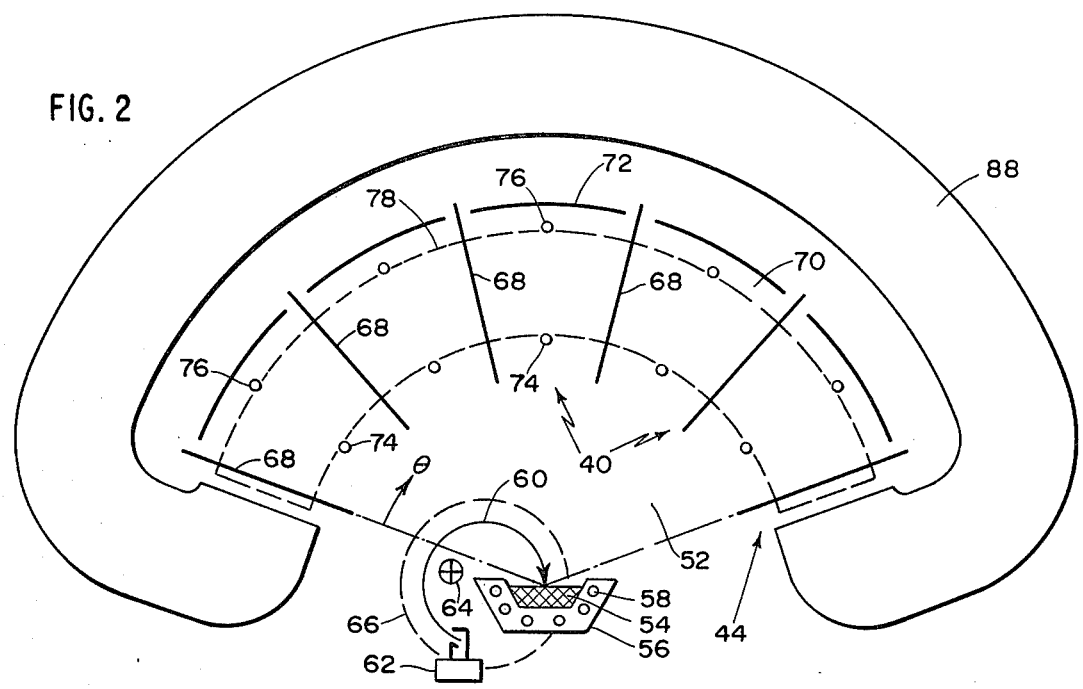
FIG. 2 is a diagrammatic view of an internal section of the ionization chamber of the FIG. 1 representation.

By reference to FIG. 2, the mechanism of this extraction system may be understood. As shown there, a radially expanding vapor flow 52 is generated from the surface of a mass 54 of uranium contained within a crucible 56. The crucible has a plurality of cooling ports 58 for heat removal. The surface of uranium mass 54 is heated in preferably a line or sequence of spots by application of an electron beam 60 from a filamentary source and power supply 62. A magnetic field 64, which may be directed between iron pole pieces 66, focuses the electron beam 60 to the line or spots on the surface.

The radially expanding vapor flow 52 is directed into the ion separator shown generally at 40. The separator 40 comprises a plurality of $U_{235}$ collection plates 68 which divide the separator 40 into a plurality of chambers 70. The rear of the chambers 70 is bounded by a unitary plate or by plural collection plates 72 for the non-ionized components of the uranium vapor flow, chiefly $U_{238}$. The plates 72 may be farther "downstream" in the vapor flow as desired. The plates 68 and 72 run into and out of the page the axial length of the ion separator 40 and are supported by their ends. Plates 68 and 72 may be fabricated of metallic uranium.

In a typical arrangement, each chamber 70 contains first and second current rods or wires 74 and 76 which are placed respectively, one behind the other, in the direction of the vapor flow 52. The current rods 74 and 76 are typically excited with current from the magnetic field current source 50 and create a plurality of magnetic field gradients within the chambers 70 over an arcuate region about the line source of vapor.

The chambers 70 are typically illuminated with radiation in the beam 32, and particularly in regions 78 which include the portion of the collection plates 68 between rods 74 and 76. The illumination of the regions 78 may typically be achieved by reflections of the beam 32 or by suitably masking the beam to the desired shape.

Figure 3:
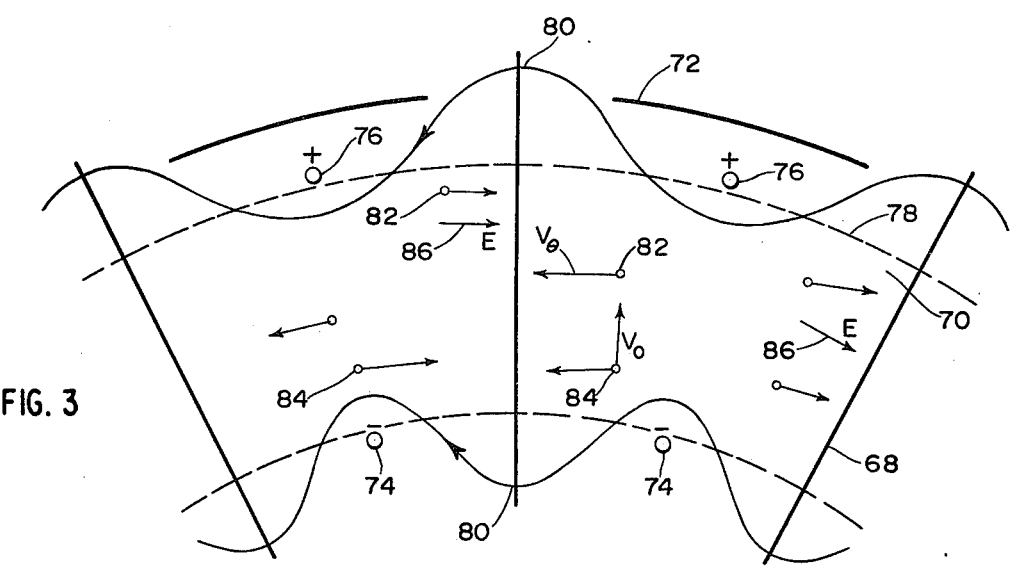
FIG. 3 is an expanded view of a portion of the FIG. 2 diagram.

An expanded representation of two chambers 70 within the ion separator 40 is shown in clearer proportions in FIG. 3. In a first embodiment, it will be assumed that the current rods 76 carry current into the page while the current rods 74 carry it out of the page. In that case, a representative magnetic field is illustrated by the induction lines 80 in FIG. 3. It will be noted that in the region between the current rods 74 and 76, the magnetic field is at a maximum intensity while in the region of the collection plates 68, it is at a minimum intensity and, therefore, a magnetic field gradient exists in the azimuthal direction between the collection plates 68 and the region between the current rods 74 and 76.

In visualizing the operation of the magnetic field gradient to accelerate ions in the vapor flow as practiced in the present invention, consider the charged particles 82 and 84 which result from selective ionization of the $U_{235}$ particles in the vapor flow and which have an outward velocity vector $V_o$ as shown in FIG. 3. As is known, this velocity in the magnetic field will produce a deviation of the particles 82 and 84 onto trajectories generally circulating about the magnetic field lines. This circulation will have a gyroradius or radius of circulation which may be calculated. For purposes of illustration, particles 82 will be assumed to comprise electrons though it is clear the charged ions 84 of $U_{235}$ in the generally neutral plasma will experience similar forces. If the radius of rotation, or gyroradius, of the charged particles is sufficiently small, implying a sufficiently strong magnetic field to cause the particle orbits to close upon themselves within dimensions small compared to the dimensions of the chambers 70, then the motion of these particles can be viewed as adiabatic, that is with no net energy change in their gyrations. The total energy of motion of the particles 82 can then be viewed as having a velocity component parallel to the magnetic field and a velocity component perpendicular to the magnetic field, the sum of which will be constant under the adiabatic conditions. Again, from the theory of magnetic bottling of a charged particle, it is known that the quotient of the particle energy perpendicular to the magnetic field divided by the magnetic field will be a constant of motion for the adiabatic system, typically defined as $\mu$, the magnetic moment. In the case of an electron particle 82, $\mu$ is defined as $I\pi r_g$ where $r_g$ is the electron gyroradius and I is the current represented by the gyrating particle. Similarly, the respective quotients of the perpendicular energy at different points divided by the magnetic field strength at those points are equal under the conditions specified. Since the orbiting particles are diamagnetic, or have an effect on the magnetic field to locally reduce it, these particles have a force on them to the weaker field region and will experience a displacement toward the plates 68. From these theoretical considerations, it can be determined that at some point in the magnetic field all the energy will of necessity have to be concentrated into the perpendicular velocity if the magnitude of the magnetic field is sufficient and there will as a result be no parallel velocity. The result of this theory is a magnetic bottling effect which constrains the particles 82 to bounce back and forth between regions of maximum field strength. Because rods 74 and 76 are linear, the magnetic bottling will be linear. If, however, collection plates 68 in FIG. 3 are interposed in the path of the electrons, they will travel only as far as the plates 68.

As a result of charge neutrality requirements in the plasma, the acceleration of the electrons 82 toward the plates 68 will have the effect of dragging ions 84, resulting from selective ionization, with the electrons, to the plates 68 for collection there. Considerations of charge exchange reactions deem it preferable that the magnetic field be sufficiently strong and the dimensions of plates 68 sufficiently small to result in an acceleration on the ions 84 of $U_{235}$ in the direction of the plates 68 before the ions charge exchange with neutral particles, typically $U_{238}$ particles, to permit collection of $U_{238}$ or loss of ionized $U_{235}$.

If the magnetic field is made sufficiently strong so that the gyroradius for not only the electrons but also the ions 84 is sufficiently small to provide adiabatic conditions for the ion motion under the influence of the magnetic field, the ions may be accelerated directly toward the plates 68 by operation of the magnetic field gradient as described above. Again, considerations of charge exchange will limit plate 68 dimensions, including their separation, as well as the conditions on the magnetic field and its gradient.

The accelerations resulting from the magnetic field gradient provide an effective means for separating the ionized particles from the un-ionized particles in the vapor flow. The magnetic field, however, exists in the region of selective ionization and can accordingly impair the selectivity of the laser ionization through splitting of the quantum levels into a range of levels, known as the Zeeman effect. This splitting of the quantum levels also expands the range of allowable transitions between any two levels and accordingly broadens the corresponding absorption line for the transition between those levels. For selective isotope ionization of uranium, it is important to be able to distinguish between the closely adjacent lines for $U_{235}$ and $U_{238}$. A broadening of these lines from Zeeman splitting will tend to overlap these adjacent lines and thus impair or destroy the selectivity of the ionization. The degree to which overlap occurs depends upon the magnetic field strength, while the practicality and effectiveness of the acceleration of the magnetic field also depends upon a high magnetic field, for example, one or more Kgauss, to maintain a sufficient gradient of, for example, 0.5 Kgauss/cm.

In the typical case, as shown in FIG. 1, the radiant energy in beam 32 will include at least one wavelength of exciting radiation and one wavelength of ionizing radiation. The exciting radiation is precisely tuned to correspond to an absorption line for the desired isotope to produce a transition from generally the ground energy level to an elevated energy level or between elevated energy levels. At least one of these radiations are isotopically selective and it is important to reduce Zeeman splitting in the line to which it is tuned. The ionizing radiation produces a transition to the continuum and is thus less important to be maintained selective unless autoionization absorption lines are employed.

The degree to which a high magnetic field may be used without loss of selectivity can be improved by maintaining polarization of the transverse electric field vector in the applied laser radiation parallel to the magnetic field in the regions 78 as shown by the electric field vectors 86. The effect of maintaining this polarization is to reduce the Zeeman splitting or broadening of the absorption lines for the uranium isotopes which would reduce the effective separation and impair the selectivity and efficiency of ionization. The polarization vector 86 may be maintained by the use of separate laser beams 32 for each chamber 70 or by reflecting the radiation in each beam through sets 87 of mirrors and Faraday rotators or polarization filters shown in FIG. 1.

Figure 4:
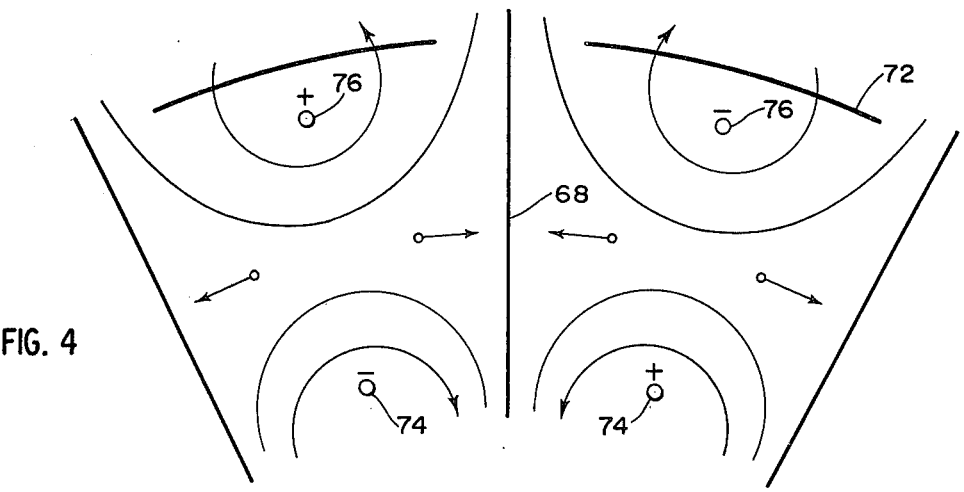
FIG. 4 is a view of an alternative form of the FIG. 3 presentation.

By reference to FIG. 4, a modification in the magnetic field gradient produced by the current rods 74 and 76 is shown. Where in FIG. 3, the top and bottom rows of current rods 76 and 74, respectively, carried currents in the same direction in each row, the rods in FIG. 4 alternate in current direction from one current rod to another in the same row as shown. This produces a magnetic field which in the azimuthal direction approaches zero in the vicinity of the collection plates 68 and has the effect of increasing the magnetic field gradient.

The magnetic field generated by current in the rods 74 and 76 of FIG. 3 is preferably closed upon itself as by a coil structure or high permeability flux path 88 shown in FIG. 2. The path 88 acts as a flux conduit between opposite ends of the stack of chambers 70, and helps to prevent interference between the magnetic fields generated by the current carrying rods 74 and 76 and the magnetic field used to focus the electron beam 60 to a line or series of spots on the surface of the uranium mass 54.

If considerations are given to system dimensions, the following guidelines may be useful. If the magnetic induction is sufficiently large that the ions would be adiabatic, the ions must be deflected towards a collector plate before they charge exchange. This suggests that $V_o$ toward the collector must approximately equal $V_f$, the flow velocity. If the plate separation is S and the magnetic field changes by the ratio R in going from its maximum value under the current coil to the collector plate 68, then $$S \leq \frac{Vf}{Vr} \frac{Bs}{Bo} \frac{R-1}{2n\sigma}$$

where $B_s$ is the value of B at the collector plate, $V_r$ is the relative velocity between ions and neutrals, $V_f$ the flow velocity, $\sigma$ the charge exchane crosssection, $B_o$ the field intensity at the point of ionization, and n the neutral particle density. Should the electrons be the only charged species which are adiabatic then their electrostatic space charge energy which equals their kinetic energy is what is available for acceleration and electrons as energetic as possible are desirable.

Having described above a preferred system for using magnetic field gradients to provide extraction of ions from a plasma environment, it will occur to those skilled in the art that various modifications and alterations to the disclosed structure and process may be achieved without departing from the spirit of the invention. Accordingly, it is intended to limit the scope of the invention only as indicated in the following claims.

What is claimed is:

1. For use in a technique of isotope enrichment, a method for separation of particles of one isotope type in an environment of flowing particles of plural isotope types comprising the steps of:
applying a magnetic field to said environment including the particles of said one isotope type; and
applying polarized radiant energy to said environment with the transverse electric field vector of electromagnetic radiation of said radiant energy aligned substantially parallel to the field lines of said magnetic field, thereby establishing a relative polarization between the applied magnetic field and the radiant energy to provide reduced absorption line width from Zeeman splitting for the particles in the magnetic field of said environment in response to the electromagnetic radiant energy;
the radiant energy ionizing particles of said one isotope type; and
said applied magnetic field diverting the flow of the ionized particles of said environment.

2. The method of claim 1 further including the step of collecting the diverted ions apart from the other components of said environment.

3. The method of claim 2 wherein said collecting step further includes the step of collecting the diverted ions on plates.

4. The method of claim 1 wherein the applied radiant energy includes plural wavelengths corresponding to excitation and ionization transitions, and the polarization is established with respect to the excitation wavelengths.

5. The method of claim 1 wherein the step of applying the magnetic field includes the step of applying a magnetic field gradient in said environment.

6. The method of claim 1 wherein said step of applying said magnetic field to said environment includes the step of applying electrical currents to a plurality of generally parallel electrical conductors in said environment.

7. The method of claim 6 wherein said electrical conductors comprise at least first and second rows of conductors with the current carried by each row of conductors being in the same direction within each row and different directions between each row.

8. The method of claim 6 wherein said electrical conductors comprise at least first and second rows with the direction of current carried by each conductor alternating between adjacent conductors.

9. The method of claim 6 wherein the currents carried by said electrical conductors create one or more linear magnetic bottles within said environment.

10. The method of claim 6 further including the step of providing a return path for said applied magnetic field.

11. The method of claim 1 further including the step of providing said environment as an expanding vapor flow through the region of the applied magnetic field.

12. For use in isotope enrichment apparatus, a system for isotope separation in an environment of flowing particles of plural isotope types comprising:
means for applying polarized radiant energy to the environment of flowing particles of plural isotope types to selectively ionize an isotope thereof;
means for applying a magnetic field to said environment to produce a deviation in the flow of the ions of said one isotope type; and
means for establishing a relative polarization between the applied radiant energy and applied magnetic field with the transverse electric vector of radiation of said radiant energy substantially parallel to the field lines of said magnetic field, thereby increasing selectivity in the particle ionization by reducing Zeeman splitting in the energy levels of said particles of said one isotope type.

13. The apparatus of claim 12 further including means for collecting the ions deviated in flow apart from the other components of said environment.

14. The apparatus of claim 13 wherein said collecting means includes a plurality of plates for collecting said ions thereon.

15. The apparatus of claim 12 wherein the applied magnetic field provides adiabatic conditions of motion for charged particles in said environment.

16. The apparatus of claim 12 wherein said means for applying said magnetic field to said environment includes a plurality of separate, generally parallel current carrying electrical conductors in said environment.

17. The apparatus of claim 16 wherein said electrical conductors comprise at least first and second rows of conductors with the current carried by each row of conductors being in the same direction within each row and different directions between each row.

18. The apparatus of claim 16 wherein said electrical conductors comprise at least first and second rows of conductors with the direction of current carried by each conductor alternating between adjacent conductors.

19. The apparatus of claim 12 wherein:
said magnetic field applying means includes means for producing field lines having an arcuate curve over dimensions large with respect to the amount of ion diversion; and
means are provided to rotate the applied radiant energy polarization over the extent of said curve.

20. The apparatus of claim 19 further including a return path for said applied magnetic field.

21. The apparatus of claim 12 further including means for providing a particle flow through the region of the applied magnetic field to define said environment.

22. For use in isotope enrichment apparatus, a system for separation of particles of one isotope type in an environment of flowing particles of plural isotope types comprising:
a plurality of discrete generally linear electrical conductors placed in at least first and second rows and extending generally transverse to the direction of flowing particles;
means for applying electrical current to said conductors to provide a magnetic field gradient in the region of said conductors;
the magnetic field gradient being generally along lines between said rows in a direction transverse to the particle flow; and
means for applying polarized radiant energy to the flowing particles in the region of said conductors with a radiation characteristic to produce selective ionization of the one isotope type, and having the electric vector of at least one frequency of radiation in said radiant energy aligned generally parallel to the field lines of said magnetic field to reduce Zeeman splitting of absorption lines for said one isotope.

23. The apparatus of claim 22 wherein said electrical conductors comprise first and second rows of current rods with the direction of current carried in each rod of a row being in the same direction but varying between rows of current rods.

24. The apparatus of claim 22 wherein said conductors are arranged in first and second rows with the direction of current flow in each conductor being different from the flow in its adjacent conductors.

* * * * *